United States Patent
Bahloul

(10) Patent No.: US 11,336,452 B2
(45) Date of Patent: May 17, 2022

(54) METHODS FOR REGISTERING DATA FROM AN INDIVIDUAL'S IDENTITY DOCUMENT AND FOR AUTHENTICATING AN IDENTITY DOCUMENT

(71) Applicant: Idemia Identity & Security France, Courbevoie (FR)

(72) Inventor: Sébastien Bahloul, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 196 days.

(21) Appl. No.: 16/855,527

(22) Filed: Apr. 22, 2020

(65) Prior Publication Data
US 2020/0344059 A1    Oct. 29, 2020

(30) Foreign Application Priority Data

Apr. 25, 2019  (FR) ........................ 1904375

(51) Int. Cl.
| | |
|---|---|
| *H04L 9/32* | (2006.01) |
| *G06K 19/06* | (2006.01) |
| *H04L 9/06* | (2006.01) |

(52) U.S. Cl.
CPC ...... *H04L 9/3226* (2013.01); *G06K 19/06028* (2013.01); *G06K 19/06037* (2013.01); *H04L 9/06* (2013.01)

(58) Field of Classification Search
None
See application file for complete search history.

(56) References Cited

U.S. PATENT DOCUMENTS

2014/0372752 A1 * 12/2014 Sallis .................. H04L 9/14
                                                    713/165
2019/0149328 A1 * 5/2019 Van Der Velden ... H04L 9/3226
                                                    713/171

FOREIGN PATENT DOCUMENTS

| EP | 3 386 143 A1 | 10/2018 |
| WO | 2012/156648 A1 | 11/2012 |

OTHER PUBLICATIONS

Adjedj, M. et al., "Biometric Identification over Encrypted Data Made Feasible," International Conference on Information Systems Security, Springer Berlin Heidelberg, dated Dec. 14, 2009, pp. 86-100.

(Continued)

*Primary Examiner* — Kristy A Haupt
(74) *Attorney, Agent, or Firm* — Womble Bond Dickinson (US) LLP

(57) ABSTRACT

The invention proposes a method for registering data from an individual's identity document (1), the method being characterized in that it comprises implementing by data processing means (21) of a server (2) the following steps:
(A) Receipt of a photograph of said individual visible on said identity document (1), an optical reading data element of the identity document (1), and at least one personal data element of said individual;
(B) Extraction by analysis of said photograph from reference information representative of the appearance of said photograph;
(C) Generation of a random string, calculation of an encoded data element by applying an encoding procedure to said reference information representative of the appearance of said photograph and said random string;
(D) Storage on the server (2) data storage means (22) of:
    Said encoded data element;

(Continued)

A cryptographic imprint of a first concatenation of the optical reading data element of the identity document (1) and the random string;

An encryption with a cryptographic imprint of a second concatenation of the optical reading data element of the identity document (1) and the random string, different from the first concatenation, of at least one personal data element of said individual.

The invention also relates to an authentication method and a server for this purpose.

10 Claims, 1 Drawing Sheet

(56) References Cited

OTHER PUBLICATIONS

Correspondence from the French National Institute of Industrial Property Office (INPI—Institute National De La Propriété Industrielle) for FR1904375 dated Jan. 17, 2020; Preliminary Research Report of the French National Institute of Industrial Property Office for FR1904375 dated Jan. 10, 2020; and Written Opinion on the Patentability of the Invention issued by the French National Institute of Industrial Property Office for FR1904375.

English translation of Correspondence from the French National Institute of Industrial Property Office (INPI—Institute National De La Propriété Industrielle) for FR1904375 dated Jan. 17, 2020; Preliminary Research Report of the French National Institute of Industrial Property Office for FR1904375 dated Jan. 10, 2020; and Written Opinion on the Patentability of the Invention issued by the French National Institute of Industrial Property Office for FR1904375.

\* cited by examiner

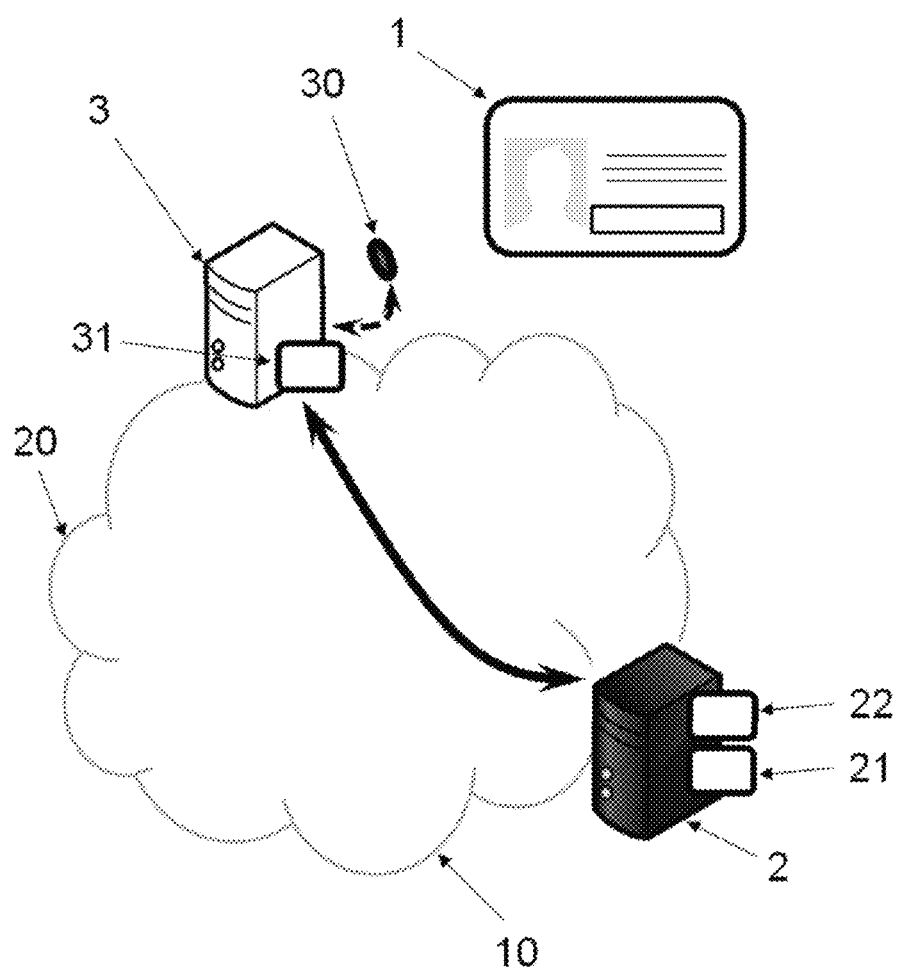

METHODS FOR REGISTERING DATA FROM AN INDIVIDUAL'S IDENTITY DOCUMENT AND FOR AUTHENTICATING AN IDENTITY DOCUMENT

CROSS-REFERENCE TO RELATED APPLICATIONS

This specification is based upon and claims the benefit of priority from French patent application number FR 1904375 filed on Apr. 25, 2019, the entire contents of which are incorporated herein by reference.

TECHNICAL FIELD OF THE INVENTION

The invention relates to processes for the registration of an identity document and the authentication of said identity document.

STATE OF THE ART

The possession of a valid identity document (identity card, passport, driving license, social security card, etc.) proves the identity of an individual.

Identity documents generally consist of a paper or plastic medium, on which a photo as well as personal alphanumeric information (surname, name, date of birth, etc.) of the holder are printed. There is also a strip called MRZ (Machine-Readable Zone), which contains a code (generally two lines of 36 characters) summarizing the alphanumeric information of the document. Alternatively to the MRZ, a PDF-417 barcode with the same information can be found.

Generally, identity documents have a large number of high-level security elements such as watermarks or holograms to prevent forgery. The lifespan of such a document is generally limited (10 or 15 years), since the appearance of its holder changes progressively, and the security elements evolve.

When an individual is examined by an entity, for example at the entrance of a building, he/she is required to show his or her identity document for authentication. It is desirable for this procedure to be as fast as possible, while being as secure as possible at the same time. Indeed, there is a risk, for example, that wanted individuals may show a forged identity document in which information has been altered, for example the photograph.

There are known patent applications, such as FR3047688 and FR1759292, on the use of data registration procedures to automatically check the identity of an individual, and associated identity control procedures, based on a very clever mechanism for generating from a visual element in an identity document (in particular, the photograph) a security data element known as "Digital Photo Seal". This security data element acts as a signature of the visual element: images acquired from the same visual element, irrespective of the conditions of acquisition (i.e. including scanning or photocopying), result in obtaining substantially identical security data. On the contrary, the slightest modification of the visual element causes a strong variation in this security element.

Therefore, the "expected" reference security data element for a given document has only to be stored in a server database and then compared against a "candidate" generated from a copy of said document to determine whether the visual element of said document has been tampered with or not.

In particular, to ensure the security of the reference data on the server, the information is "masked" by applying an encoding procedure (typically a sketch-like procedure) to said reference data and to a random string, and the masked reference data is stored in the database with a cryptographic imprint, i.e. a hash, of an MRZ concatenation with said random string.

An identity document presented by an individual can then be authenticated on the basis of his/her MRZ and photograph: a candidate security data element is obtained from the photograph of the presented document, and it is then possible, by application of a decoding procedure, to retrieve the random string if the photograph of the presented document is identical to that from which the reference security data was generated, and to verify that the hash of a concatenation of the MRZ with said random string matches that stored.

This solution provides complete satisfaction. More recently, it has been proposed to also store alphanumeric data on the server, in particular "visual" data, i.e. data printed on the identity document such as vital records information (surname, given name, address, date of birth, etc.) or technical data such as the expiry date of the identity document. This would avoid having to retype them.

However, although this information is "accessible" since it is written on the identity document, it is personal data that cannot be freely stored on a server, especially since these servers generally have unencrypted databases that hackers could access in the event of an attack.

Today, there are only two ways to automatically obtain said alphanumeric data while respecting privacy:
  Either analysis of the MRZ, which summarizes the alphanumeric information in the document, but on the one hand some information is excluded (e. g. the address), and on the other hand only standardized characters are supported, and, for example, accents or cedillas are lost, which can lead to errors;
  or by OCR (optical character recognition) on an image of the identity document, which theoretically makes it possible to have all the alphanumeric data, but has a high reading error rate that is not acceptable in the absence of human verification.

It would therefore be desirable to have a solution that is simple, reliable, secure and completely respectful of privacy, alphanumeric data or any other personal data.

BRIEF DESCRIPTION OF THE INVENTION

According to a first aspect, the invention relates to a process for registering data from an individual's identity document, the process being characterized in that it comprises the implementation of server data processing means, according to the following steps:
(A) Receipt of a photograph of said individual visible on said identity document, an optical reading data element of the identity document, and at least one personal data element of said individual;
(B) Extraction by analysis of said photograph from reference information representative of the appearance of said photograph;
(C) Generation of a random string, calculation of an encoded data element by applying an encoding procedure to said reference information representative of the appearance of said photograph and said random string;
(D) Storage on the server data storage means of:
  Said encoded data element;

A cryptographic imprint of a first concatenation of the optical reading data element of the identity document and the random string;

An encryption with a cryptographic imprint of a second concatenation of the optical reading data element from the identity document and the random string, different from the first concatenation, of at least one personal data element of said individual.

According to other advantageous and nonlimiting characteristics:

the encoding procedure is a procedure for sketching a "secure sketch" type of algorithm;

the optical reading data element of the identity document is of the MRZ, QR code or PDF417 type;

said personal data of said individual is an alphanumeric data element associated with said individual, said photograph of the individual, said optical reading data element, and at least one alphanumeric data element is printed on the identity document;

the reference information representative of an expected appearance of said photograph is a Digital Photo Seal security data element;

the first and second concatenations correspond to the two possible directions of concatenation of the optical reading data element of the identity document and the random string.

According to a second aspect, the invention relates to a process for authenticating an identity document, characterized in that it comprises an implementation, according to the following steps:

(b) Receipt by data processing means from a server of an acquired image of said identity document, the image representing at least a photograph of an individual and an optical reading data element visible on said identity document;

(c) Extraction, by analysis of said image acquired by the server data processing means, of:

candidate information representative of the appearance of said photograph as represented in the acquired image;
said optical reading data element as represented in the acquired image;

(d) Calculation of a decoded data element matching a random string by applying a decoding procedure to said candidate information representative of the appearance of said photograph and to an encoded data element stored on the server data storage means;

(e) Verification that a cryptographic imprint of a first concatenation of the extracted optical reading data element and the decoded data element matches the cryptographic imprint of the first concatenation of the optical reading data element of the identity document and the random string stored on the server data storage means;

(f) Decrypting at least one personal data element of said encrypted individual stored on the server data storage means, by means of the cryptographic imprint of a second concatenation of the extracted optical reading data element and the decoded data.

According to other advantageous and open-ended features, the process comprises a step (a) of prior acquisition of said image of said identity document representing at least a photograph of an individual and an optical reading data element visible on said identity document by means of optical acquisition means of a client equipment.

According to a third aspect, the invention relates to an authentication server, characterized in that it comprises data storage means and data processing means configured to:

Receive a photograph of said individual visible on said identity document, an optical reading data element of the identity document, and at least one personal data element of said individual;

Extract by analysis of said photograph a reference information representative of the appearance of said photograph;

Generate a random string, and calculate an encoded data element by applying an encoding procedure to said reference information representative of the appearance of said photograph and said random string;

Store on a data storage means:

Said encoded data element;

A cryptographic imprint of a first concatenation of the optical reading data element of the identity document and the random string;

An encryption with a cryptographic imprint of a second concatenation of the optical reading data element from the identity document and the random string, different from the first concatenation, of at least one personal data element of said individual.

According to other advantageous and open-ended features, the data processing means are further configured to:

Receive an acquired image of an identity document, the image representing at least a photograph of an individual and an optical reading data element visible on said identity document;

extract, by analysis of said acquired image:

candidate information representative of the appearance of said photograph as represented in the acquired image;

said optical reading data element as represented in the acquired image;

Calculate a decoded data element matching a random string by applying a decoding procedure to said candidate information representative of the appearance of said photograph and to an encoded data element stored on the data storage means;

Verify that a cryptographic imprint of a first concatenation of the extracted optical reading data element and the decoded data element matches the cryptographic imprint of the first concatenation of the optical reading data element of the identity document and the random string stored on the data storage means;

Decipher at least one personal data element of said encrypted individual stored on the data storage means, by means of the cryptographic imprint of a second concatenation of the extracted optical reading data element and the decoded data.

According to a fourth and fifth aspect, the invention relates to a computer program product comprising code instructions for the execution of a process according to the first data registration aspect of an individual's identity document or according to the second authentication aspect of an identity document; and a storage medium readable by a computer equipment whereupon a computer program product includes code instructions for performing a process according to the first data registration aspect of an individual's identity document or according to the second authentication aspect of an identity document.

DESCRIPTION OF THE FIGURES

Other characteristics, purposes and advantages of the present invention will be seen from the following detailed description, with reference to the appended FIGURES provided by way of non-limiting examples, in which:

FIG. 1 schematically depicts a system for the implementation of the method according to the invention;

DETAILED DESCRIPTION

Architecture

This invention relates to, on one hand, a process for registering information from an individual's identity document 1 and, on the other hand, a process for authenticating said identity document 1.

With reference to FIG. 1, an authentication system architecture for the implementation of these processes has been schematically depicted. This system comprises at least one identity document 1 and one server 2. The system can also comprise client equipment 3 connected to the server 2 via a network 20 such as Internet.

The Identity document 1 is a personal object to an individual (many individuals may each possess such an identity document), and is an official title, advantageously issued by a government agency. This document can take many forms such as an identity card or passport, and can optionally be electronic. According to an embodiment, the document takes the form of a chip card (or smart card) with standard dimensions and generally made of PVC or polycarbonate.

In all cases, the identity document 1 shall have a solid surface on which a certain amount of information shall be printed and in particular:
- A photograph of the individual holding the card (and optionally another "graphical" data such as an individual's signature);
- an optical reading data (i.e. automatically readable, intended for computers), of the MRZ, QR code or PDF417 type (the example, of the MRZ type will be used in the rest of the document, but it will be understood that it is not limited to this type of optical reading data);
- Various alphanumeric data elements, known as "visual data", chosen in particular from:
- Complete number of the identity document 1;
- Date of expiration;
- Date of issue;
- Surname;
- Given name(s);
- Nationality;
- Date of Birth;
- Place of Birth;
- Sex;
- Size;
- Address;
- etc.

The server 2 is a remote, secure equipment, typically belonging to an authority or a security service supplier. It comprises the data processing means 21 (processor like) and the data storage means 22 (memory, for example a hard disk).

The client equipment 3 is a local terminal including optical acquisition means 30 (typically a camera or scanner), and adapted to acquire and, if necessary, transmit to the server 2 an image (from the document 1 as shown below). The client equipment 3 and the server 2 advantageously comprise communication interfaces enabling them to dialogue remotely. Preferably, the client 3 is an individual's mobile device (especially a smartphone).

It should be noted that the equipment 3 can take many different embodiments. More specifically, as shown below, for the implementation of the invention, it is sufficient for the server 2 to be able to receive an image acquired from the identity document 1 in one way or another, including indirectly: It should also be noted that client equipment 3 may include its own data processing facilities and implement certain processing operations; see below.

In any case, as explained, the client equipment 3 can acquire an image from the identity document 1, i.e. photograph a photocopy rather than the identity document 1 directly, even a photocopy of a photocopy, etc. As shown below, it will be sufficient that the acquired image represents the identity document 1. It will be understood that the present method is in no way limited to obtaining this image nor is it limited to any particular kind (the acquired image can be black and white, poor quality, etc.).

It is noted that it is quite possible for other entities to be connected to server 2 and to the equipment 3, in particular servers implement services that confirm the assertions produced by equipment 3, i.e. services wishing to authenticate the identity document 1, for example a server from a bank, hotel, etc.

Digital Photo Seal

In a known way, the present methods use information representative of the appearance of a photograph (or another graphical element of document 1), i.e. descriptive data of at least one fragment of this photograph as it appears, i.e. a "signature", which will allow comparisons.

The information representative of the "theoretical" appearance of the visual element, i.e. as it is expected, is designated as "reference" information. On the other hand, the information representative of the appearance observed of the visual element, i.e. as represented in an acquired image, is designated as "candidate" information. It will be understood that this observed appearance is generally not perfectly identical to the expected appearance, due to the conditions of inherent defects in the image acquisition process, and to the variability of the conditions under which the shot is taken (lighting, movement, distance, etc.).

Nonetheless, said information representative of the appearance is chosen such that if two visual elements have matching appearances (i.e. it involves the same visual element even if the conditions under which the shot is taken are not identical), then the representative information thereof also matches (i.e. has a gap according to a given metric that is less than a threshold).

Therefore, the reference information and the candidate information match if and only if the observed and expected appearance of the photograph match, i.e. it is the same photograph, in other words the photograph printed on the identity document 1 has not been fraudulently altered. This verification can be done for each other graphical element such as a signature.

Information representative of the appearance of the photograph may be used as the "Digital Photo Seal" (DPS) which will be used as an example throughout this application, i.e. the security data element as described in the applications cited in the introduction or, more precisely, the application EP3206192, based on the position of singular points on the graphical element, or any other "signature" of a graphic object such as a photograph.

The DPS of a photograph is a feature of this image that is not a biometric model, and may, for example, include an oriented gradient histogram (referred to as a HOG descriptor algorithm). Alternatively, a classification algorithm of the type using a convolutional neural network, also known as CNN (Convolutional Neural Network), can be used.

Registration Process

According to a first aspect, a process is proposed that is implemented by the server 2 data processing means 21 of the data registration server of an individual's identity document 1.

The process begins with a step (A) of receiving a photograph of said individual visible on said identity document 1, an optical reading data element of the identity document 1, and at least one personal data element of said individual, in particular an alphanumeric data element associated with said individual, although it is also possible to take any other data element relating to the person such as a biometric template or identification proof. Preferably, said personal data is alphanumeric data more precisely associated with the identity document 1, in particular a "visual data" element printed on the document 1 as previously indicated, but it is understood that it may also be an e-mail address, an access identifier, etc., which are not necessarily printed on the document 1.

This step (A) can be implemented using an image of the identity document 1 (as explained for the authentication process), but preferably, to avoid digitization and quality degradation problems, these data (i.e. photograph, optical reading data and/or personal data) are obtained directly, for example, from a government authority. This also allows for possible updating of the data, see below.

In a step (B), as previously explained, the extraction by analysis of said photograph of the reference information (noted DPS for convenience, although, as previously explained, this process is not limited to the Digital Photo Seal), representative of the appearance of said photograph, is implemented using a known algorithm.

Then, in a step (C) a random string (noted RNG) is generated, so as to calculate an encoded data element (noted SSK for convenience, although, as previously explained, this method is not limited to secure sketch) by applying an encoding procedure to said DPS reference information representative of the appearance of said photograph and said RNG random string, i.e. SSK=enc(DPS, RNG).

The RNG random string is, as its name suggests, a random data value that provides randomness, which is important due to the fact that knowing this information will allow to prove that we have the identity document 1.

Preferably, the encoding procedure is a sketching procedure of a "secure sketch" algorithm. This sketching procedure is known to the skilled person. It is described in particular in the document "Fuzzy Extractors: How to Generate Strong Keys from Biometrics and Other Noisy Data", by Dodis et al. (see definition 3 on page 11 of this document).

However, other encoding procedures can be used by the processing unit 4 instead of a sketching procedure (e. g. fuzzy extractor algorithm procedures and fuzzy logic in general).

Note that the encoding procedure can be applied directly to said reference information representative of the appearance of said photograph, but also indirectly, i.e. to data derived from this reference information to add entropy. For example, a combination of the reference information with the optical reading data element, including a number of the first few bits of its cryptographic imprint, can be used as derived data (see below). In particular, this combination can be a "or exclusive", i.e. XOR(DPS; HMRZ), HMRZ being the first n bits of the cryptographic imprint of the optical reading data element (in the example, where it is the MRZ) where n is the number of bits of the reference information (the same number of bits is required for XOR).

In any case, the encoding procedure allows to "mask" the RNG random string by the result of the DPS processing of the photograph, but in a way that it can be obtained by means of a decoding procedure that is complementary to the encoding procedure.

Whereupon the encoding procedure used for registration is a sketching procedure of a secure sketch algorithm, the decoding procedure is the recovery procedure of the same secure sketch algorithm. Such a recovery procedure is also known to the skilled person (see definition 3 on page 11 of the document "Fuzzy Extractors: How to Generate . . . " aforementioned).

More precisely, if we note DpsRef, the reference information, and DpsCand, a candidate information (with SSK=enc(RNG, DpsRef)), then the encoding and decoding procedures are such that if DpsCand is close enough to DpsRef (i.e. different by less than a threshold, which is normally the case if the representative information is extracted from the same photograph from which the reference information was generated, even if it is noted that it is still impossible for the two values to match, we will always have |DpsCand−DpsRef|>0) then the decoded data element is equal to the RNG random string.

If, on the contrary, DpsCand is not close enough to DpsRef, then the decoded data element is not the correct value of the random string.

Mathematically, the decoding procedure gives, for a value of the SSK encoded data element and for a candidate information value DpsCand, "the value x=dec(SSK, DpsCand) such that there is a standard value E below a given threshold verifying that SSK=enc(x,DpsCand+ε)", x being equal to the random value RNG if DpdCand+ε=DpsRef is correct.

It should be recalled that such encoding and decoding procedures are known to the skilled person, and can be implemented in many different ways. It will also be possible to increase the entropy of the encoded data element by applying the encoding procedure to more data than just the information representative of the appearance of the photograph and the random string.

This method is particularly distinguished in a storage step (D) on the server 2 data storage means 22 of:
Said SSK encoded data;
A cryptographic imprint of a first concatenation of the optical reading data element of the identity document 1 and the RNG random string;
An encryption with the cryptographic imprint of a second concatenation of the optical reading data element of the identity document 1 and the RNG random string, different from the first concatenation, of at least one personal data element of said individual.

It is understood that none of these data is usable in itself since:
SAID SSK encoded data element alone does not allow to find the reference DPS information or the RNG random string;
The cryptographic imprint of a first concatenation of the optical reading data element of the identity document 1 and the RNG random string is a simple imprint providing no information;
The encryption of personal data is not readable by anyone without the key.

Step (D) may include encrypting at least one personal data element of said individual and then storing it. This data can be indexed in the memory 22 with a cryptographic imprint of an identifier of the identity document 1, generally obtained from the MRZ.

A cryptographic imprint, or hash, is the result of a predetermined cryptographic hash function.

Preferably, the first and second concatenations match concatenations in two different directions, for example MRZ|RNG for the first concatenation and RNG|MRZ for the second concatenation, but any other construction such as two concatenations in the same order but including a predetermined character in the middle, for example MRZ|1|RNG and MRZ|2|RNG can be used.

It is understood that the optical reading data element of the identity document 1 and the random string can be considered as bit sequences. The number of bits of the concatenation is then the sum of the respective numbers of bits of the optical reading data element of the identity document 1 and the random string.

For convenience, we note the first imprint of said cryptographic imprint of the first concatenation (h(MRZ|RNG) in particular), and the second imprint of the cryptographic imprint of the second concatenation (h(RNG|MRZ) in particular).

The cleverness of these multiple concatenations allows the formation of several completely independent imprints from the same data. Indeed, even when knowing the first imprint (which is stored on memory 22, and could therefore be obtained by a hacker), it is not possible to obtain the second imprint. It is still necessary to have the RNG random string value, which can only be obtained by having the reference information.

Therefore, the personal data encrypted with the second cryptographic imprint (i.e. the second imprint is used as a key) remains accessible only to the holder of the identity document 1, so that server 2 cannot handle or know the user's personal data, which can be stored safely.

The first imprint can be associated in the server 2 with a descriptor of the status of the identity document 1, for example "OK", "Expired" or "KO".

Please note that the registration process can be repeated at regular intervals to verify or update personal data. Recent and reliable data can be retrieved from a government entity. In addition, an identity document 1 has only a limited lifetime, and must be renewed regularly.

Authentication of the Identity Document

It is now assumed that the registration has been successfully completed, and that the identity document is now usable.

In a preferred embodiment, the authentication process begins with a step (a) of acquiring in one way or another (e.g. via client 3 acquisition means 30) an image of the identity document 1, the image representing at least the photograph of the individual and the optical reading data element of the identity document 1 (the MRZ) visible on said identity document 1. Preferably, said image represents the whole identity document 1, at least one complete face. As explained, it may be necessary to acquire a plurality of images, for example to see all the faces.

Typically, it is the individual who takes a picture of his/her own identity document 1 with his/her mobile device.

We will now disclose the main part of the authentication method of an individual presenting an identity document 1 as his/her own, and thus providing an acquired image of said identity document 1.

The objective is to verify that step (a) has been successfully completed as previously described, and that there is no forgery (for example, an image that had been fraudulently modified). In order to do this, the individual or any other entity that wishes to authenticate the identity document 1 submits this image to the server 2.

In step (b), the server 2 data processing means 21 receive said image acquired from an identity document 1 presented by said individual. As explained, the image represents at least the photograph of the individual and the optical reading data element of the identity document 1 visible on said identity document 1.

In a step (c), the server 2 data processing means 21 analyze the image in order to extract:
candidate information (DPS) representative of the appearance of the photograph as depicted in the acquired image;
the optical reading data element of the identity document 1

Extraction of candidate information includes identifying the photograph that appears in the image, and obtaining the candidate information in the same way that the reference information was obtained at registration. The identification of the photograph can be done using templates and masks (indeed, identity documents always have the same organization), and therefore, the analysis of the image may include the recognition of an outline of the identity document 1, the cropping of this outline, and the application of predetermined masks. To do this, suitable convolutional neural networks can be artfully used. Similarly, there are algorithms for automatically extracting optical reading data, especially since MRZ zones are specially designed to be easily read by a computer system.

Once the photograph has been "isolated" on the image, the same algorithms as those applied to the original photograph are applied to obtain candidate information representative of the appearance of the photograph as shown.

It is understood that the reference and candidate information must be obtained in an identical way in order to be able to be compared.

In a step (d), the server 2 data processing means 21 calculate a decoded data element by applying a decoding procedure to said candidate information (DPS) representative of the appearance of said photograph and to said encoded data element stored on the server 2 data storage means 22.

More precisely, the server 2 accesses the SSK encoded data element associated with the identity document 1 (typically referenced with the imprint of its identifier, which, for example, can be obtained from the MRZ), and applies the previously mentioned decoding procedure. As previously explained, if the reference and candidate information are close enough, the decoded value will match the RNG random string value used to obtain this SSK encoded data element.

The term "match" generally means that the result of a comparison of the candidate information and the reference information should show that they are identical, or at least have a gap of less than a predetermined error threshold. For example, for graphical elements, the Digital Photo Seal security data elements match if they differ by less than 10%.

It is therefore understood that the random string value "masked" by the DPS can be recovered if the user has a photograph that is identical to the one used at the time of registration from which the reference information is derived.

In a step (e), the data processing means 21 verifies that a cryptographic imprint of a first concatenation of the extracted optical reading data element and the decoded data element match the cryptographic imprint of the first concatenation of the optical reading data element of the identity document 1 and the random data stored on the server 2 data storage means 22.

In other words, the server 2 attempts to reconstruct the first imprint by performing the same first concatenation of the extracted optical reading data element and the decoded data element.

If:
the extracted optical reading data element matches the optical reading data used during registration; and
the decoded data element matches the random string;
Then the first concatenation will give exactly the same result and we will obtain the first imprint again.

In all other cases, the entropy of the cryptographic hash functions means that a very different result will be achieved. If document 1 has been altered (e. g. by replacing the photograph), then the candidate and corresponding reference information will not match, resulting in a false value of both the random string and the first imprint, and therefore the authentication will be rejected. A fraudulent use alert can be issued.

If the first imprint was found, it is due to the identity document 1 is valid, i.e. not falsified. A descriptor associated with the first imprint can be optionally consulted to obtain the status of the document 1: "OK", "Expired", "KO". For example, this status can define whether the holder of the document 1 has the right to enter an area at the entrance of which the control is taking place.

If the individual is given the OK status, then he/she can enter, and if he/she has the Expired status, it is due to he/she normally has the right to enter, but his/her access needs to be updated. If the individual is given the KO status, it means that he/she has been recognized, but he/she does not have the necessary level of authorization.

Alternatively, the server 2 can, whereupon the document 1 is successfully authenticated, transmit to the possible connected entity authenticating the individual (e. g. a server implementing a service as explained) an authorization, for example encrypted with a public key from said entity (the authorization itself is typically a single-use token). Alternatively, such an encrypted authorization can be transmitted to the client equipment 3, for retransmission to the connected entity, and decryption and verification by the latter. Such an embodiment is particularly advantageous since it allows total confidentiality: not only does the server 2 not have access to the individual's personal data, but it also has no contact with the connected entity to which the individual requires authentication, so that it does not even have the possibility to know why the authentication is required.

At this stage, the individual may be asked to provide personal information, for example alphanumeric data, to complete a registration if he/she has been granted access, or to complete a form requested by the service implemented by the connected entity. Now he/she will be able to cleverly use the second concatenation to automatically obtain this data.

For this purpose, in a last step (f) (which may optionally be conditioned on a particular status, for example, only if the individual has the right to go further), then the data processing means 21 decrypts at least one personal data element of said encrypted individual stored on the server 2 data storage means 22 by means of the cryptographic imprint of a second concatenation of the extracted optical reading data element and the decoded data element.

Indeed, at this stage we know that the decoded data element corresponds to the random string and that the individual was able to successfully reconstruct the first imprint. By changing only the concatenation (in particular by reversing the MRZ and the random data), and by reapplying the cryptographic hash function, the second imprint can be reconstructed, which is the private key to the personal data.

All or part thereof, as requested, are then transferred to the client equipment 3. It is understood that, in order to guarantee confidentiality as much as possible, server 2 should provide the encrypted data as it stands, and that it is at the client 3 that the decryption takes place, so as to avoid any clear transfer of personal data.

It should be noted that the user could be allowed to use this opportunity to update this personal data: if, for example, his/her address has changed, he/she modifies the data before re-encrypting it, and retransmitting the complete updated information to the server 2 for storage.

Server

According to a third aspect, the authentication server 2 is proposed for the implementation of processes according to the first or second aspect, i.e. registration and authentication of an identity document 1.

The server 2 is typically connected to a network 20, and comprises the data storage means 22 and the data processing means 21 configured to (in the case of registration):
Receive a photograph of said individual visible on said identity document 1, an optical reading data element of the identity document 1, and at least one personal data element of said individual;
Extract by analysis from said photograph a reference DPS information representative of the appearance of said photograph;
Generate an RNG random string, and calculate an SSK encoded data element by applying an encoding procedure to said DPS reference information representative of the appearance of said photograph and said random string;
Store on the data storage means 22:
This data is SSK encoded;
A cryptographic imprint of a first concatenation of the optical reading data element of the identity document 1 and the RNG random string;
An encryption with a cryptographic imprint of a second concatenation of the optical reading data element of the identity document 1 and the RNG random string, different from the first concatenation, of at least one personal data element of said individual.

In case of authentication, the data processing means are also configured to:
Receive an acquired image of an identity document 1, the image representing at least a photograph of an individual and an optical reading data element visible on said identity document 1;
extract, by analysis of said acquired image:
candidate information representative of the appearance of said photograph as represented in the acquired image;
said optical reading data element as represented in the acquired image;
Calculate a decoded data element matching an RNG random string by applying a decoding procedure to said candidate DPS information representative of the appearance of said photograph and an encoded data element stored on the data storage means 22;
Verify that a cryptographic imprint of a first concatenation of the extracted optical reading data element and the decoded data element matches the cryptographic imprint of the first concatenation of the optical reading data element of the identity document 1 and the random string stored on the data storage means 22;

Deciphering at least one personal data element of said encrypted individual stored on the data storage means 22, by means of the cryptographic imprint of a second concatenation of the extracted optical reading data element and the decoded data element.

The system may also include at least one client equipment 3 (typically connected to server 2 via the network 20, directly or indirectly) comprising optical acquisition means 30 for acquiring said image of the identity document 1.

Computer Program Product

According to a fourth and fifth aspect, the invention relates to a computer program product comprising code instructions for executing (in particular on the server 2 data processing means 21) a process according to the first or second aspect of the invention, as well as storage means readable by a computer equipment (server 2 memory 22) whereupon this computer program product is located.

The invention claimed is:

1. A method of registering data from an individual's identity document (1), the method being characterized in that it comprises implementing by a server (2) data processing means (21), the following steps:
   (A) Receipt of a photograph of said individual visible on said identity document (1), an optical reading data element of the identity document (1), and at least one personal data element of said individual;
   (B) Extraction by analysis of said photograph of a reference information representative of the appearance of said photograph;
   (C) Generation of a random string, calculation of an encoded data element by applying an encoding procedure to said reference information representative of the appearance of said photograph and said random string;
   (D) Storage on the server (2) data storage means (22) of:
      Said encoded data element;
      A cryptographic imprint of a first concatenation of the optical reading data element of the identity document (1) and the random string;
      An encryption with a cryptographic imprint of a second concatenation of the optical reading data element of the identity document (1) and the random string, different from the first concatenation, of at least one personal data element of said individual.

2. The method according to claim 1, wherein the encoding procedure is a sketching procedure of a secure sketch algorithm.

3. The method according to claim 1, wherein the optical reading data element of the identity document (1) is a data of the MRZ, QR code or PDF417 type.

4. The method according to claim 1, wherein said personal data element of said individual is an alphanumeric data element associated with said individual, said photograph of the individual, said optical reading data element, and at least one alphanumeric data element are printed on the identity document (1).

5. The method according to claim 1, wherein the reference information representative of an expected appearance of said photograph is a Digital Photo Seal security data element.

6. The method according to claim 1, wherein the first and second concatenation correspond to the two possible directions of concatenation of the optical reading data element of the identity document (1) and the random string.

7. A method for authenticating an identity document (1), characterized in that it comprises the implementation of the following steps:
   (b) Receipt by a server (2) data processing means (21) of an acquired image of said identity document (1), the image representing at least a photograph of an individual and an optical reading data element visible on said identity document (1);
   (c) Extraction, by analysis of said acquired image by the server (2) data processing means (21), of:
      candidate information representative of the appearance of said photograph as represented in the acquired image;
      said optical reading data element as represented in the acquired image;
   (d) Calculation of a decoded data element corresponding to a random string by applying a decoding procedure to said candidate information representative of the appearance of said photograph and to an encoded data element stored on the server (2) data storage means (22);
   (e) Verification that a cryptographic imprint of a first concatenation of the extracted optical reading data element and the decoded data element matches the cryptographic imprint of the first concatenation of the optical reading data element of the identity document (1) and the random string stored on the server (2) data storage means (22);
   (f) Decrypting at least one personal data element of said encrypted individual stored on the server (2) data storage means (22), by means of the cryptographic imprint of a second concatenation of the extracted optical reading data element and the decoded data element.

8. The method according to claim 7, comprising a step (a) of pre-acquisition of said image of said identity document (1) representing at least a photograph of an individual and an optical reading data element visible on said identity document (1) by optical acquisition means (30) of a client equipment (3).

9. An authentication server (2), comprising a data storage means (22) and a data processing means (21) configured to:
   Receive a photograph of an individual visible on an identity document (1), an optical reading data element of the identity document (1), and at least one personal data element of said individual;
   Extract by analysis from said photograph reference information representative of the appearance of said photograph;
   Generate a random string, and calculate an encoded data element by applying an encoding procedure to said reference information representative of the appearance of said photograph and said random string;
   Store on the data storage means (22):
      Said encoded data element;
      A cryptographic imprint of a first concatenation of the optical reading data element of the identity document (1) and the random string;
      An encryption with a cryptographic imprint of a second concatenation of the optical reading data element of the identity document (1) and the random string, different from the first concatenation, of at least one personal data element of said individual.

10. The server according to claim 9, wherein the data processing means (21) are further configured to:
   Receive an acquired image of an identity document (1), the image representing at least a photograph of an individual and an optical reading data element visible on said identity document (1);
   extract, by analysis of said acquired image:
      candidate information representative of the appearance of said photograph as represented in the acquired image;

said optical reading data element as represented in the acquired image;

Calculate a decoded data element corresponding to a random string by applying a decoding procedure to said candidate information representative of the appearance of said photograph and to an encoded data element stored on the data storage means (22);

Verify that a cryptographic imprint of a first concatenation of the extracted optical reading data element and the decoded data element matches the cryptographic imprint of the first concatenation of the optical reading data element of the identity document (1) and the random string stored on the data storage means (22);

Decipher at least one personal data element of said encrypted individual stored on the data storage means (22), by means of the cryptographic imprint of a second concatenation of the extracted optical reading data element and the decoded data element.

\* \* \* \* \*